Ansel Cain.
Cane.

№ 24,718. Patented July 12, 1859.

Witnesses

Inventor
Ansel Cain

UNITED STATES PATENT OFFICE.

ANSEL CAIN, OF HOLYOKE, MASSACHUSETTS.

WALKING-CANE.

Specification of Letters Patent No. 24,718, dated July 12, 1859.

*To all whom it may concern:*

Be it known that I, ANSEL CAIN, of Holyoke, in the county of Hampden and State of Massachusetts, have invented a new and useful Improvement that I denominate an "Illuminative Walking-Staff," and that the following is a full, clear, and exact description thereof, reference being had to the accompanying drawings, making a part of the specification, in which—

Figure 1:
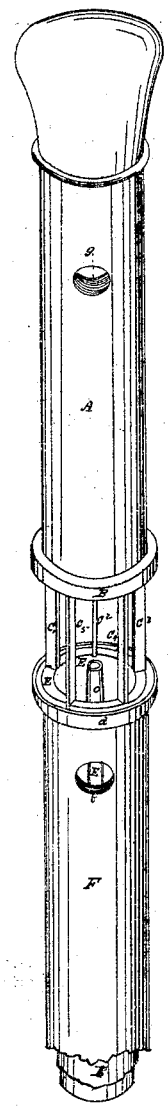
Figure 2:
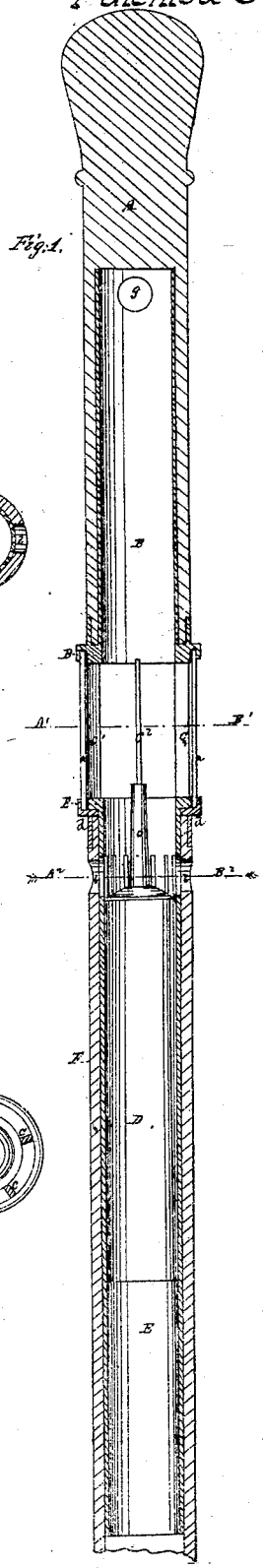
Figure 3:
Figure 4:

Figure 1 is a longitudinal section. Fig. 2 is a transverse section through A′ B′ Fig. 1. Fig. 3 is a transverse section through A² B² Fig. 1. Fig. 4 is an isometrical view with $a$, Fig. 1 removed. The drawings are full size except the length of Figs. 1 and 4 which are represented as broken off.

Similar letters of reference refer to like parts in all the drawings.

The nature of my invention consists in constructing a walking-staff, containing within itself a lamp, the flame of which shall be surrounded with glass, and ventilation properly provided for; in such a manner that the staff can be used for walking the same as the common walking-staff, and at the same time be made to furnish sufficient light, to light the way of those using it in the darkest night.

The construction of my invention is as follows: A is the upper part of the staff made hollow and lined with a metal tube B, the lower end of which is thick enough to receive the upper ends of posts $C'$, $C^2$, $C^3$, $C^4$, $C^5$, into which they are firmly riveted—and also to form a groove to receive the glass $a$. The lower ends of posts $C'$, $C^2$, &c., are attached to another metal tube E of the same size as tube B, and the top end—to which the posts $C'$, $C^2$, &c., are attached—just wide enough to receive the posts. In the tube E, the lamp D, is placed by being pressed up into the tube from the bottom and prevented by a pin in the tube from rising above its proper place. This tube (E) is also provided with a series of slots around its circumference at equal distances, opposite the lower part of the tube O, of the lamp, and holes $b$, $b$, $b$, $b$, in the outer case, through which air is supplied to the flame of the lamp. F is the lower part of the staff, with a ferrule $d$, on the top end, through which there is a hole of the same diameter as the outside of tube E, and through which the tube slides. The ferrule $d$, projects outwardly at the top to the outside diameter of the glass $a$, and is turned up to form the outside of groove S, for glass $a$, to rest in. The lamp is ventilated through hole $g$, in the upper part of the staff.

Operation of lighting: Grasp the staff below the glass with one hand, and above the glass with the other; draw the upper part a short distance out of the lower part, leaving the glass resting in groove S, remove the extinguisher (not represented in the drawings) and apply over the top of the glass a lighted match to the wick, close the parts together and it is ready for use.

The advantages of my invention I conceive to be that, as many persons carry staffs when walking in the evening it would be no additional inconvenience—if provided with my invention—to carry a light at the same time; and many that are not in the habit of walking with staffs, if out in the evening would carry my invention for the sake of the light, when they would not carry a common lantern.

What I claim as my invention and desire to secure by Letters Patent is:

The combination of the lamp constructed and arranged in the manner described with the walking-cane, for the purpose herein set forth.

Holyoke April 25th 1859.

ANSEL CAIN.

Witnesses:
STEPHEN HOLMAN,
WM. GROVER.